(No Model.)
B. F. ORTON.
REGULATOR FOR DYNAMO ELECTRIC MACHINES.
No. 331,814. Patented Dec. 8, 1885.
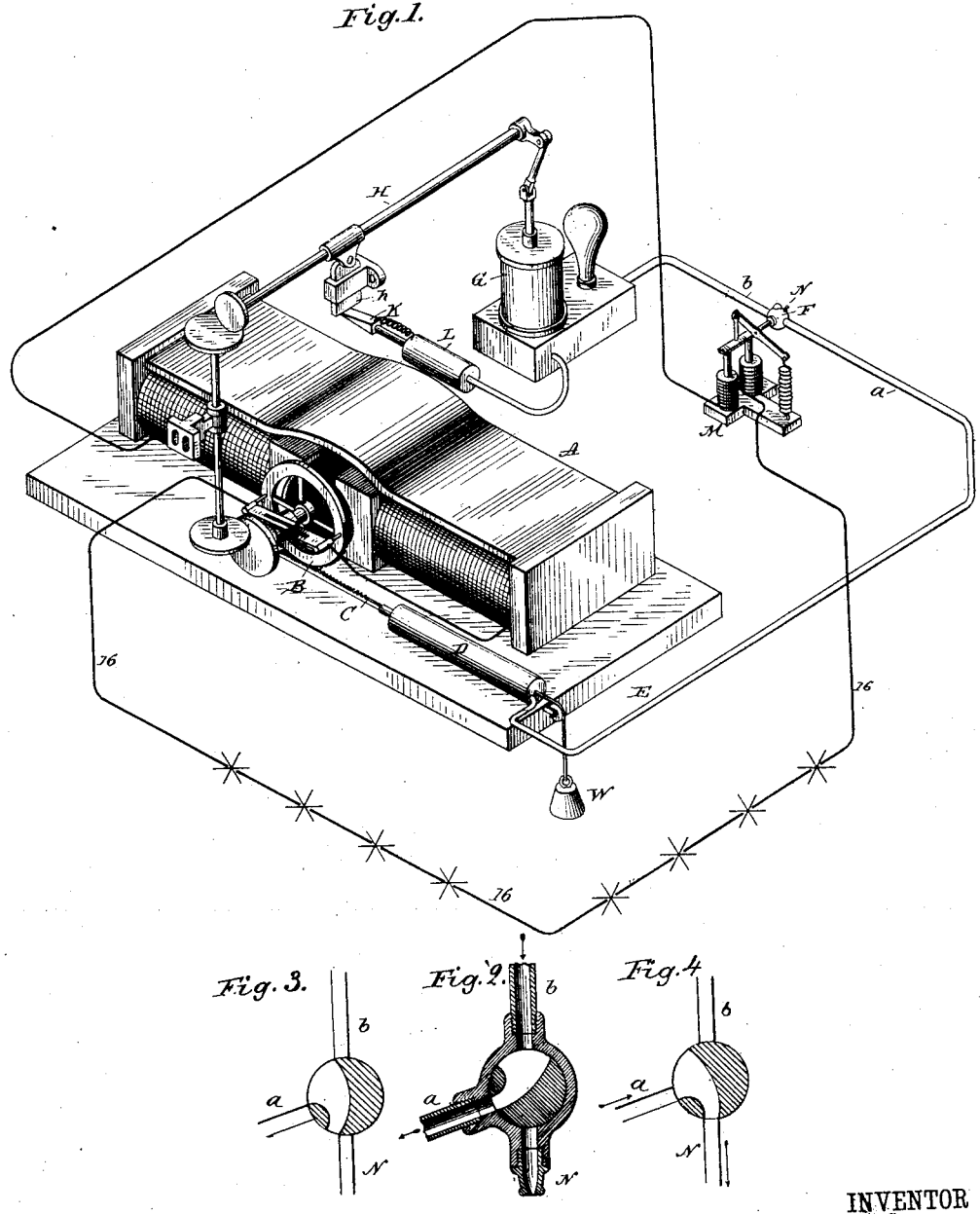
WITNESSES:
INVENTOR
B. F. Orton
BY
his ATTORNEY

UNITED STATES PATENT OFFICE.

BENJAMIN F. ORTON, OF EAST SAGINAW, MICHIGAN.

REGULATOR FOR DYNAMO-ELECTRIC MACHINES.

SPECIFICATION forming part of Letters Patent No. 331,814, dated December 8, 1885.

Application filed June 2, 1884. Serial No. 133,562. (No model.)

*To all whom it may concern:*

Be it known that I, BENJAMIN F. ORTON, a citizen of the United States, and a resident of East Saginaw, in the county of Saginaw and State of Michigan, have invented certain new and useful Improvements in Regulators for Dynamo-Electric Machines, of which the following is a specification.

My invention relates to governors or regulators for dynamo-electric or magneto-electric machines, and is designed to provide a simple and effective combination of devices whereby the current supplied by the machine may be properly controlled.

My invention consists in the combination, with any proper device for adjusting or varying the current of the machine—such, for instance, as an adjustable commutator or means for varying the field-magnet's strength—of an air or fluid pump, an electro-magnet, a valve or cock controlled thereby, and devices governed by variations of the air or fluid pressure for adjusting or varying the action of the mechanism for regulating the action of the dynamo-machine.

My invention consists, also, in the combination, with the current-governor controlled or adjusted in the manner just described, of an air-pump for establishing the desired air-pressure, and mechanism for driving said pump from the dynamo, said mechanism being constructed to be automatically coupled and uncoupled by variations of pressure, so as to automatically maintain the desired pressure for operating the adjusting devices, while at the same time permitting the pump to be kept out of action so long as the conditions do not require an adjustment to be made, and the requisite air-pressure or vacuum is maintained.

In carrying out my invention I prefer to make use of the well-known expedient of adjusting the commutator to determine or regulate the current of the dynamo-machine, but might use other expedients—as, for instance, that of varying the power of the field-magnet by varying the number of its coils in circuit, or by varying the current on the same constant number of field-magnet coils, or otherwise. The device for acting on the adjustable commutator or other adjustable device may be actuated through air or fluid pressure, or vacuum, and by any of the well-known devices for indicating or showing differences of pressure—such, for instance, as those commonly employed in pressure-gages, and consisting either of a cylinder and piston, a diaphragm, or a bent tube like that of the Bourdon gage. As typical of such devices, I have herein shown a cylinder and piston, since this device furnishes the best means of getting extended movement, and when combined with a suitable retractor does not demand increase of pressure with differences of adjustment. In obtaining the pressure or vacuum, I use an air-pump, and by preference drive the same from the shaft of the dynamo-machine. When so driven, I usually combine with it suitable coupling mechanism, whereby it may be uncoupled from the shaft so long as the requisite pressure or vacuum is maintained in the chamber or reservoir connected to the piston and cylinder, but may be automatically coupled on a diminution of such pressure or vacuum. The pressure or vacuum in the cylinder or other device is governed by any suitable arrangement of cocks or valves controlled by an electro-magnet or other device responding to changes in an electric current, and so arranged as to maintain a constant pressure or vacuum of the proper amount in the cylinder to keep the regulator or governor of the dynamo in the proper position, or to diminish or increase such vacuum or pressure when the regulator is to be adjusted to increase or decrease the electro-motive force of the current generated by the dynamo.

Having described the general principles of the apparatus and the manner of combining the same, I will proceed to describe one of the particular ways of carrying out my invention that may be used in practice.

In the accompanying drawings, Figure 1 is a perspective view showing an apparatus constructed and combined in accordance with my invention. Figs. 2, 3, and 4 show the various positions of a cock or valve under the three several conditions demanding, respectively, that the regulator or governor be adjusted to increase the current, that the adjustment or position of the current governor or regulator should be maintained, and that an adjustment should be had to diminish the current.

A indicates a dynamo-electric machine of any ordinary or desired construction, and B an adjustable support for the commutator-brushes of the commutator for the machine. The support B consists, in the form of governor or regulator here shown, of a toothed wheel or segment mounted in any suitable manner so as to be capable of rotation, and to thereby shift the brushes with relation to the neutral point, thus governing or regulating the current of the machine.

D indicates a cylinder containing a piston whose rod is provided with a rack or other mechanical connection with B, such that the latter may be turned backward and forward by the piston. The cylinder D, at a point behind the piston, is connected with a pipe, E, leading to an air-pump or a reservoir connected with said pump. Increase of pressure behind the piston moves the brushes of the regulator in one direction. Diminution of pressure permits a weight, W, or other suitable retractor to move the piston and brushes in the opposite direction. Constancy of pressure sufficient to balance the weight W keeps the regulator in the normal or adjusted position.

F indicates a cock or valve in the pipe leading to the air pump or reservoir, and M an electro-magnet connected with the circuits of the machine so as to be affected by variations of current in the circuit or circuits. It is here shown as placed in the direct circuit with the lights or other working-resistances. The valve or cock F is a three-way cock whose spindle or stem is upon the spindle supporting the lever to which the movable cores of the electro-magnet M are attached. The cock F has the three connections indicated—one, b, leading to the air pump or reservoir; another, a, to the pressure device that actuates the commutator, and a third, N, consisting of an exhaust or vent. The ports are so arranged that when the current of the machine is normal and the magnet M balances its retractor the cock will stand in the position shown in Fig. 3, with all the ports to the reservoir and the cylinder D closed. If the current increase, the cock will be turned to the position shown in Fig. 2, thus establishing communication between the air-pump, reservoir, and the cylinder, and causing a forward adjustment of the brushes or other regulator, so to reduce the electro-motive force. If the current in the circuit run down below normal, the cock will take the position shown in Fig. 4, thus permitting the air to escape from behind the piston in D and the weight W to draw back the brushes of the commutator, so as to increase the current to normal. As soon as this is effected, the position of Fig. 3 is resumed, and the air confined in the cylinder holds the piston balanced against the action of the retractor W. This general action and operation takes place whenever necessary by reason of any change in the current, due to cutting out of lights, movement of the commutator or other regulator through diminution of air-pressure in D, or to other cause.

I do not wish to be understood as limiting myself to the particular construction of cock or valve herein shown. Any form or construction may be employed, and any desired arrangement of pipe or connections to the cylinder or other pressure device and to the air-pump or its reservoir may be used for producing the adjustments described under varying conditions of the electro-magnet M or other device responding to changes in the current.

The cylinder of an air-pump is indicated at G. I prefer in general to run the pump by mechanical connection with the shaft of the dynamo. Such connection may be of any desired form, that shown consisting of a crank-shaft carrying the crank of the piston for the air-pump and driven by brush-wheels or other gearing leading to the armature-shaft. To permit the pump to be thrown out of action when the desired pressure in its reservoir is reached, and to be kept out so long as such pressure is maintained, I propose to mount the bearings for the crank-shaft on a suitable movable support, as h, which may be raised to lift the brush-wheel on the end of the shaft from connection with its driving-disk. The support h is controlled in position by a wedge or inclined piece, K, or other suitable mechanical device, that is connected to the piston of a cylinder, L, connected with the air-reservoir. A suitable retracting-spring acts on the piston in opposition to the air-pressure, and is adjusted to permit the block K to be held in such position as to lift the brush-wheel and keep the driving mechanism disconnected while there is the proper pressure in the cylinder L. If such pressure diminish, however, the retractor draws back the block, and the pump begins to operate and continues to operate until the desired or regulated pressure is reached, when the support h is again raised and the pump disconnected.

I do not limit myself to any particular form of disconnecting mechanism.

What I claim as my invention is—

1. The combination, with a dynamo-machine regulator, of devices for adjusting the same through variations of air or fluid pressure, an air or fluid pump, a driving-power therefor, and mechanism for throwing off the driving-power when the pressure reaches a predetermined degree.

2. The combination, with a dynamo-machine, of an adjustable commutator controlled by variations of air or fluid pressure, a pump worked from the shaft of the machine, and an electro-magnet controlling a valve or cock in the pipe between the air-pump and the mechanism that acts on the commutator.

3. The combination, with a dynamo-machine, of a current-governor therefor worked by variations of air-pressure, an air-pump mechanically connected with the shaft of the machine, and disconnecting mechanism for severing the connection with the shaft when the air-pressure produced through the agency of such pump reaches a predetermined degree.

4. The combination, with a dynamo-electric machine, of an adjustable commutator, mechanism for actuating the same through air or fluid pressure, an air-pump driven from the dynamo, a cock or valve in the passage from the air-pump to the commutator-actuating device, and an electro-magnet controlling said cock or valve, as and for the purpose described.

5. The combination, with a dynamo-machine regulator, of an air-pump, an electro-magnet, a valve or cock controlled thereby, and devices for adjusting the regulator through variations of air or fluid pressure.

Signed at New York, in the county of New York and State of New York, this 27th day of May, A. D. 1884.

BENJAMIN F. ORTON.

Witnesses:
THOS. TOOMEY,
GEO. C. COFFIN.